(12) United States Patent
Nakao et al.

(10) Patent No.: US 12,030,511 B2
(45) Date of Patent: Jul. 9, 2024

(54) DISPLAY CONTROL METHOD AND DISPLAY CONTROL DEVICE

(71) Applicant: Nissan Motor Co., Ltd., Yokohama (JP)

(72) Inventors: Hikaru Nakao, Kanagawa (JP); Akira Morimoto, Kanagawa (JP); Kosuke Sato, Kanagawa (JP); Shohei Nakamura, Kanagawa (JP); Shuko Ishimaru, Kanagawa (JP)

(73) Assignee: Nissan Motor Co., Ltd., Yokohama (JP)

( * ) Notice: Subject to any disclaimer, the term of this patent is extended or adjusted under 35 U.S.C. 154(b) by 357 days.

(21) Appl. No.: 17/608,687

(22) PCT Filed: Apr. 27, 2020

(86) PCT No.: PCT/JP2020/017960
§ 371 (c)(1),
(2) Date: Nov. 3, 2021

(87) PCT Pub. No.: WO2020/230613
PCT Pub. Date: Nov. 19, 2020

(65) Prior Publication Data
US 2022/0212689 A1    Jul. 7, 2022

(30) Foreign Application Priority Data

May 15, 2019   (JP) ................................. 2019-092485

(51) Int. Cl.
*B60W 50/00*    (2006.01)
*B60W 50/14*    (2020.01)

(52) U.S. Cl.
CPC ....... *B60W 50/14* (2013.01); *B60W 2050/146* (2013.01)

(58) Field of Classification Search
CPC ........... B60W 50/14; B60W 2050/146; B60W 30/18163; B60W 2540/20; B60W 2540/215; B60K 37/02; B60K 2370/1529; B60K 2370/166; B60K 2370/175; B60K 2370/182; B60K 37/06; B60K 35/00; G01C 21/365; G01C 21/3658; G08G 1/0962;
(Continued)

(56) References Cited

U.S. PATENT DOCUMENTS 10,870,435 B2    12/2020  Fujisawa et al.
2010/0253594 A1*  10/2010  Szczerba ................ G08G 1/167
                                                                   345/7

(Continued)

FOREIGN PATENT DOCUMENTS

JP    2015-011458 A    1/2015
JP    2016-199204 A    12/2016
(Continued)

*Primary Examiner* — Khoi H Tran
*Assistant Examiner* — Tien Minh Le
(74) *Attorney, Agent, or Firm* — Young Basile Hanlon & MacFarlane, P.C.

(57) ABSTRACT

In a display control method, if a control system proposes an automatic lane change to a driver of a host-vehicle, an arrow icon for guiding an automatic lane change is displayed on a head-up display, and a display method for the arrow icon is switched depending on a plurality of processes in the control performed by the control system.

7 Claims, 13 Drawing Sheets

(58) Field of Classification Search
CPC ...... G08G 1/167; G09G 2380/10; G09G 5/36; G09G 5/00
See application file for complete search history.

(56) References Cited

U.S. PATENT DOCUMENTS

| | | | |
|---|---|---|---|
| 2016/0304126 | A1 | 10/2016 | Yamaoka et al. |
| 2018/0118223 | A1* | 5/2018 | Mori ..................... B60W 30/12 |
| 2018/0157038 | A1* | 6/2018 | Kabe .................. G02B 27/0101 |
| 2018/0297611 | A1 | 10/2018 | Fujisawa et al. |
| 2018/0345991 | A1* | 12/2018 | Mimura ............. B62D 15/0255 |
| 2018/0354517 | A1 | 12/2018 | Banno et al. |
| 2019/0047561 | A1* | 2/2019 | Nishiguchi ........... B60W 50/14 |

FOREIGN PATENT DOCUMENTS

| | | |
|---|---|---|
| JP | 2017074918 A | 4/2017 |
| JP | 2017-84112 A | 5/2017 |
| JP | 2017-97495 A | 6/2017 |
| JP | 2019012236 A | 1/2019 |
| JP | 2019-36086 A | 3/2019 |

* cited by examiner

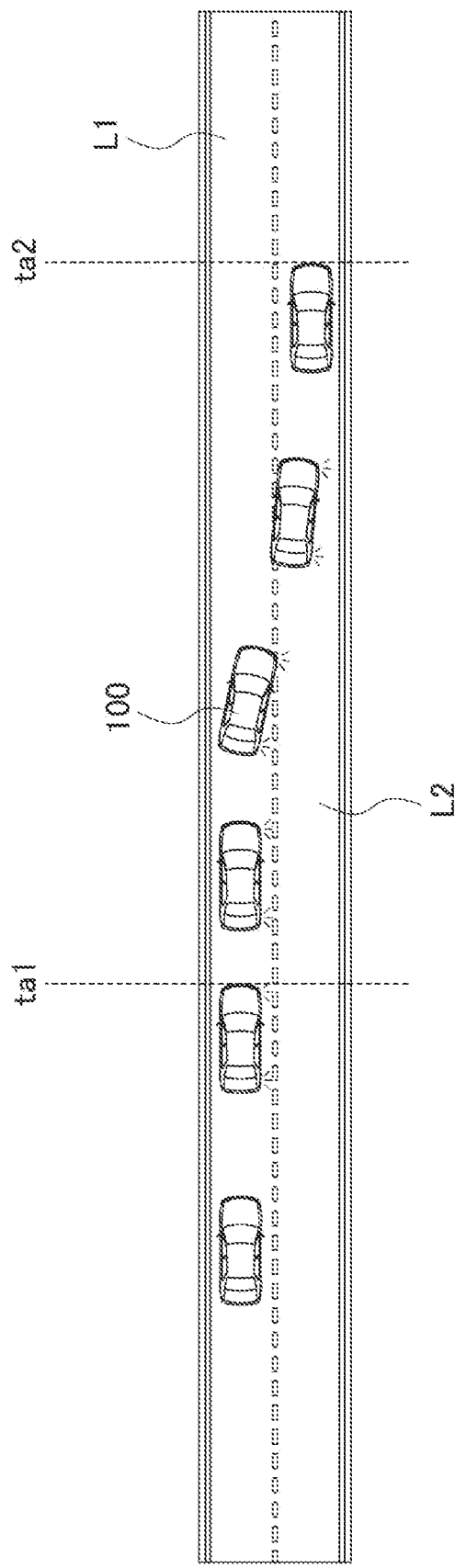

DISPLAY CONTROL METHOD AND DISPLAY CONTROL DEVICE

CROSS-REFERENCE TO RELATED APPLICATION(S)

This application claims priority to and the benefit of Japanese Application Patent Serial No. 2019-092485, filed May 15, 2019, the entire disclosure of which is hereby incorporated by reference.

TECHNICAL FIELD

The present invention relates to a display control method and a display control device.

BACKGROUND

Conventionally, a display control device has been disclosed, which displays information to be visually recognized by a driver on a display (for example, Japanese Unexamined Patent Application Publication No. 2015-11458). Japanese Unexamined Patent Application Publication No. 2015-11458 discloses contents of displaying, on a head-up display device, a superimposed display image showing a travel route when a lane change is performed by a control system. Further, Japanese Unexamined Patent Application Publication No. 2015-11458 discloses that the progress of a lane change is indicated in the travel route shown in the superimposed display image.

SUMMARY

If complicated automatic driving such as a lane change is performed, the control performed by a control system includes a plurality of processes. Therefore, there is a requirement for the driver to be able to perceive which of the processes of the control the driver is in. According to the method disclosed in Japanese Unexamined Patent Application Publication No. 2015-11458, it is possible to perceive a change in the travelling position of a host-vehicle, but it is not possible to perceive which of the processes of the control the driver is in.

The present invention is made in view of the above described problems, and an object of the present invention is to provide a display control method, and a display control device in which a driver can perceive a process of the control performed by a control system.

In a display control method according to one aspect of the present invention, if a control system proposes a lane change to a driver of a host-vehicle, an image showing an arrow is displayed on a display, and a display method for the image showing the arrow is switched depending on a plurality of processes in the control performed by the control system.

According to the present invention, a driver can perceive the state of the control performed by the control system to change a lane.

BRIEF DESCRIPTION OF THE DRAWINGS

FIG. 6 is an explanatory diagram for showing a series of movements from a first lane to a second lane of a host-vehicle in a situation where an automatic lane change proposed by a driver is performed;

DETAILED DESCRIPTION

Figure 1:
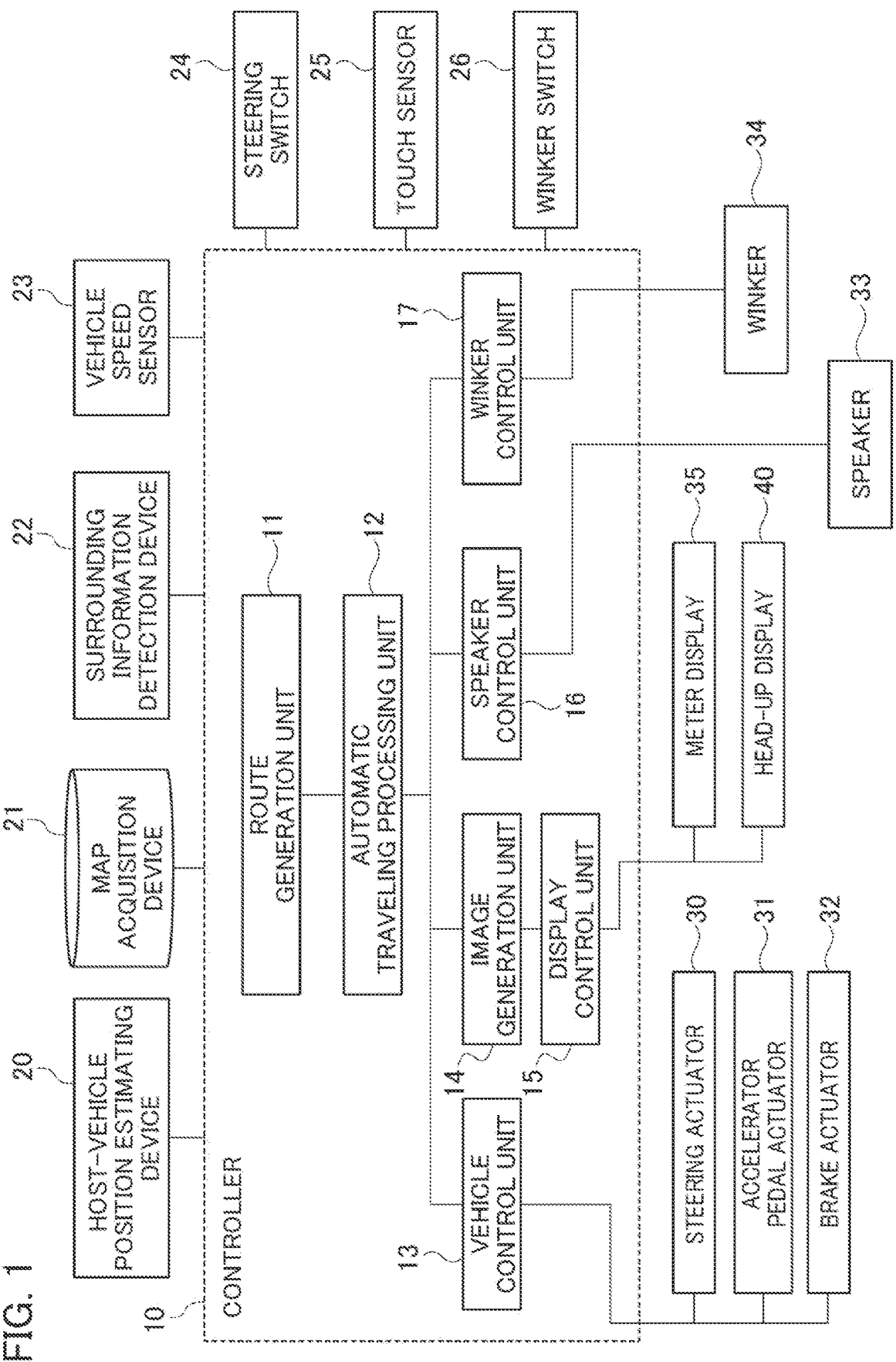
FIG. 1 is a block diagram for showing a control system applied with a display control device according to the present embodiment.

An embodiment of the present invention will be described below with reference to the drawings. In the drawings, the same parts are denoted by the same reference numerals, and description thereof is omitted.

A display control device according to the present embodiment will be described by applying the display control device to a control system (a vehicle control system). The control system controls the behavior of a host-vehicle to perform automatic driving. Automatic driving means, for example, a state in which at least one of actuators, such as a brake, an accelerator, and a steering is controlled without an operation by an occupant. Therefore, other actuators may be actuated through the operation by the occupant. The automatic driving may be a state in which any control such as acceleration/deceleration control and lateral position control is performed. Further, in the present embodiment, manual driving means, for example, a state in which the occupant operates the brake, accelerator, and steering. The host-vehicle may be capable of switching between automatic driving and manual driving.

An example of automatic driving is an automatic lane change. An automatic lane change means that the control system controls the behavior of the host-vehicle so that the host-vehicle changes a lane from a host-vehicle lane on which the host-vehicle travels to either one of the right and left adjacent lanes adjacent to the host-vehicle lane.

Figure 2:
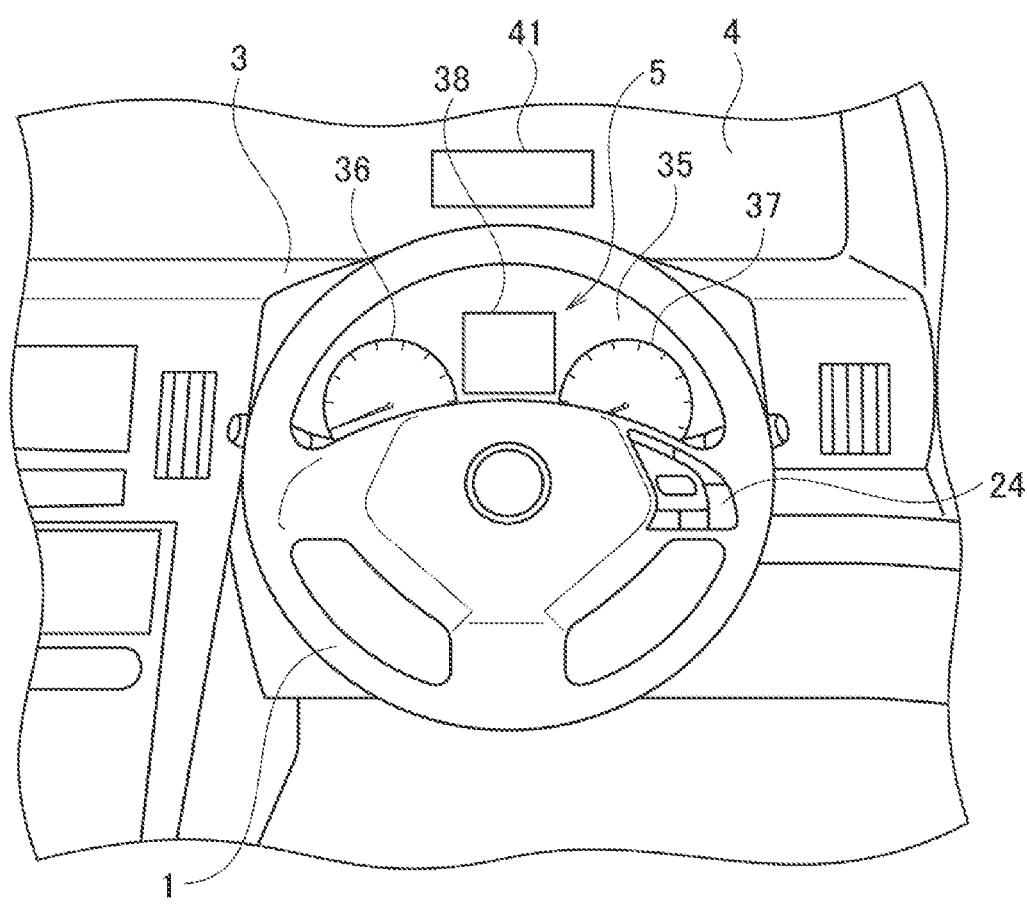
FIG. 2 is an explanatory diagram for schematically showing a scene ahead of a driver's seat of a host-vehicle.

A configuration of the control system will be described with reference to FIGS. 1 and 2. The control system includes a controller 10, a host-vehicle position estimating device 20, a map acquisition device 21, a surrounding information detection device 22, a vehicle speed sensor 23, a steering switch 24, a touch sensor 25, and a winker switch 26. Further, the control system includes a steering actuator 30, an accelerator pedal actuator 31, and a brake actuator 32. Still further, the control system includes a meter display 35 and a head-up display 40.

In the interior of the host-vehicle applied with the control system, a steering 1 is arranged ahead of a driver, and an instrument panel 3 is arranged ahead of the steering 1. The instrument panel 3 is provided with a meter unit 5 for displaying, to the driver, a meter of the host-vehicle. A windshield 4 is arranged ahead of the instrument panel 3.

The controller 10 is a general-purpose microcomputer including a CPU (a central processing unit), a memory, and an input/output unit. The microcomputer is installed with a computer program (a display control program and a control program) for causing the microcomputer to function as a display control device, and the control system. By executing the computer program, the microcomputer functions as a plurality of information processing circuits in the control system. The present embodiment shows an example in which the software implements the plurality of information processing circuits in the control system. However, it is also possible to configure the information processing circuits by preparing dedicated hardware for performing each information process described later. Further, the plurality of information processing circuits may be constituted by individual hardware. Details of the plurality of information processing circuits of the controller 10 will be described later.

The host-vehicle position estimating device 20 measures position information of the host-vehicle by using a position estimation technique such as GPS (global positioning system) and odometry. The host-vehicle position estimating device 20 measures an absolute position of the host-vehicle, that is, a position of the host-vehicle relative to a predetermined reference point, a vehicle speed, an acceleration, a steering angle, and an attitude of the host-vehicle by using various types of sensors and the like. The host-vehicle position estimating device 20 includes sensor for acquiring the behavior of the host-vehicle, such as a GPS receiver, inertial navigation equipment, sensors provided to a brake pedal and an accelerator pedal, a wheel speed sensor and a yaw rate sensor, a laser radar, a camera, and the like. The host-vehicle position estimating device 20 outputs the measured position information of the host-vehicle to the controller 10.

The map acquisition device 21 acquires map information showing a structure of a road on which the host-vehicle travels. The map information acquired by the map acquisition device 21 includes information on a road structure such as an absolute position on each lane, the relationship on how lanes are connected, and the relationship on relative positions, traffic rules, road signs, and the like. The map acquisition device 21 may have a map database storing the map information, or alternatively may acquire the map information from an external map data server by cloud computing. Further, the map acquisition device 21 may acquire the map information by using the vehicle-to-vehicle communication or vehicle-to-road communication. The map acquisition device 21 outputs the acquired map information to the controller 10.

The surrounding information detection device 22 includes a plurality of different kinds of object detection sensors mounted on the host-vehicle. The object detection sensors are, for example, laser range finders, laser radars, millimeter wave radars, cameras or the like. The surrounding information detection device 22 detects an object around the host-vehicle by using the object detection sensors. The surrounding information detection device 22 detects moving objects including another vehicle, a motorcycle, a bicycle, and a pedestrian, and stationary objects including a parked vehicle. For example, the surrounding information detection device 22 detects the positions, attitudes (yaw angles), sizes, speeds, accelerations, jerks, decelerations, and yaw rates of the moving object and the stationary object relative to the host-vehicle. The surrounding information detection device 22 may acquire surrounding information using the vehicle-to-vehicle communication or vehicle-to-road communication. The surrounding information detection device 22 outputs the detected information to the controller 10.

The vehicle speed sensor 23 detects the vehicle speed of the host-vehicle. The vehicle speed sensor 23 outputs the detected vehicle speed of the host-vehicle to the controller 10.

The steering switch 24 outputs an operation signal according to an operation by a driver. The steering switch 24 is provided to the steering 1. The steering switch 24 outputs, to the controller 10, the operation signal according to the operation by the driver.

The touch sensor 25 is provided to the steering 1, and detects that the driver's hands have touched the steering 1. As the touch sensor 25, a capacitance type sensor for detecting a change in the capacitance can be used. If the driver's hands touch the steering 1, the touch sensor 25 outputs a predetermined detection signal to the controller 10.

The winker switch 26 outputs an actuation signal for actuating a winker (a direction indicator) 34, and is operated by the driver. After being operated by the driver, the winker switch 26 outputs the actuation signal of the winker 34 to the controller 10.

The steering actuator 30 controls a steering angle of the steering 1. The controller 10 controls the steering actuator 30.

The accelerator pedal actuator 31 controls the stepping amount of an accelerator pedal. The controller 10 controls the accelerator pedal actuator 31.

The brake actuator 32 adjusts the stepping amount of the brake pedal. The controller 10 controls the brake actuator 32.

The meter display 35 is arranged to the meter unit 5. The meter display 35 displays a predetermined image such that the driver can visually recognize the image. The driver can recognize various pieces of information from the image displayed on the meter display 35. The meter display 35 is formed of, for example, a liquid crystal panel. The image displayed on the meter display 35 is controlled by the controller 10.

The meter display 35 displays an image showing a meter of the host-vehicle. The image showing the meter includes a tachometer image 36 showing a tachometer, and a speedometer image 37 showing a speedometer. The tachometer image 36 is displayed in a left area of the entire area of the meter display 35. The speedometer image 37 is displayed in a right area of the entire area of the meter display 35.

The meter display 35 displays a second information image 38 showing information notified to the driver by the control system. The second information image 38 is displayed in a central area of the entire area of the meter display 35. That is, the second information image 38 is displayed at a space between the tachometer image 36, and the speedometer image 37.

The tachometer and the speedometer may be formed of analog meters, and the meter display 35 may display only the second information image 38.

The head-up display 40 is arranged in the instrument panel 3. The head-up display 40 displays a predetermined image such that the driver can visually recognize the image by a remote display using a virtual image. The display light emitted from the head-up display 40 is projected on the windshield 4 through an opening (not shown) provided to the instrument panel 3. The display light is reflected by the windshield 4 to reach the eyepoint of the driver. This causes the driver to visually recognize the virtual image at the outside of the windshield 4. In this way, the head-up display 40 emits the image toward the windshield 4, and displays a virtual image obtained by the emitted image, such that the virtual image is superimposed on the scene ahead of the host-vehicle.

The head-up display 40 displays a first information image 41 showing information notified to the driver by the control system. The driver can simultaneously visually recognize the first information image 41 displayed by the head-up display 40, and the scene ahead of the host-vehicle viewable through the windshield 4.

Figure 3:
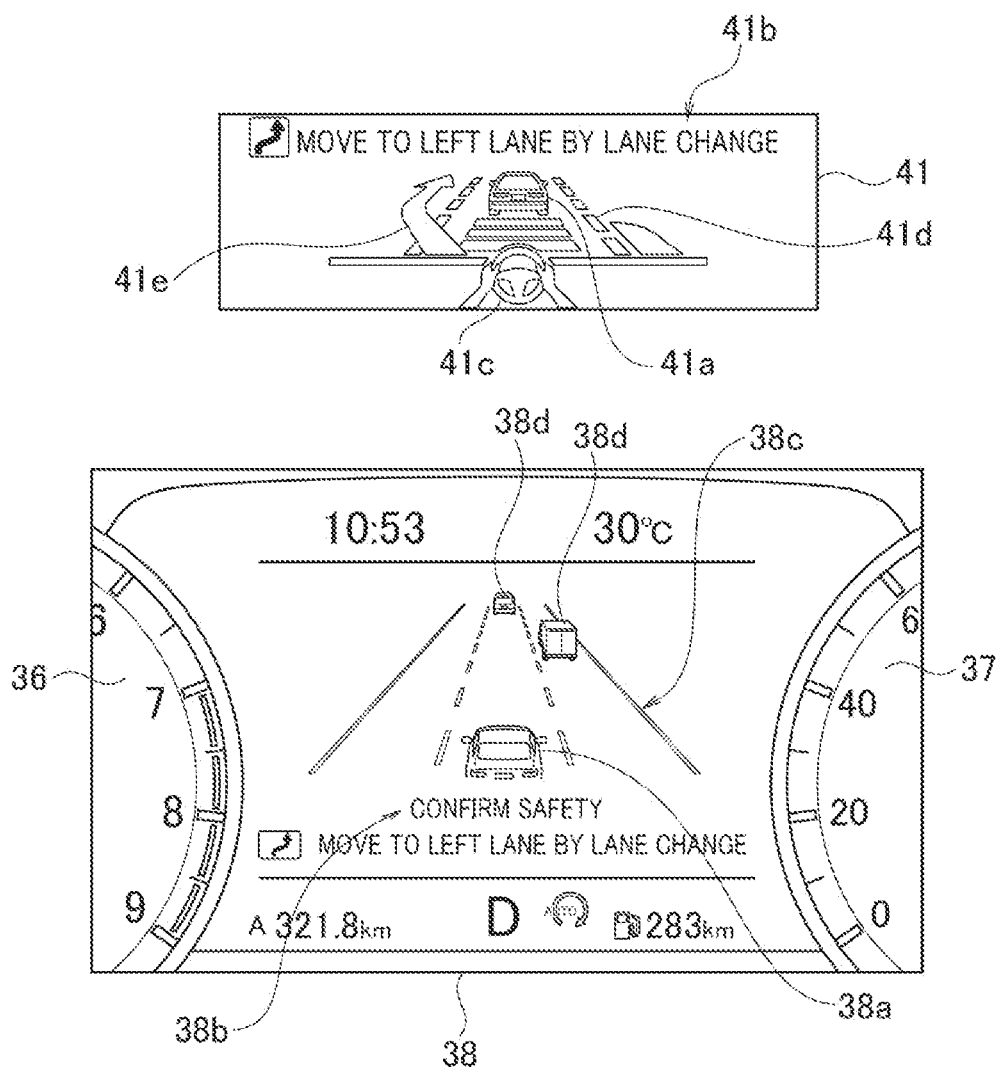
FIG. 3 is an explanatory diagram for explaining a first information image, and a second information image.

With reference to FIG. 3, the first information image 41 displayed on the head-up display 40, and the second information image 38 displayed on the meter display 35 will be described.

The first information image 41 is mainly composed of a preceding vehicle icon 41a, a first character string 41b, a mode display icon 41c, a first lane marker icon 41d, and an arrow icon 41e.

The preceding vehicle icon 41a is a figure showing a preceding vehicle traveling on the same lane as the host-vehicle.

The first character string 41b includes one or more characters such as Hiragana characters, Chinese characters, numbers and symbols, and is, for example, a sentence. Further, the first character string 41b may include emoji (a pictogram) that plays the same role as the character.

The first character string 41b indicates contents notified to the driver by the control system. The contents of the first character string 41b may be the contents of a request from the control system, for example, an operation instruction to the driver to perform an automatic lane change or the like. Further, the contents of the first character string 41b may be control contents of what the control system desires to perform, for example, an automatic lane change to be performed. That is, the control system uses the first character string 41b to notify the driver of the request from the control system, or what the control system desires to perform. The first character string 41b has the relationship to be the same as a part of the second character string 38b which will be described later.

The first character string 41b is arranged above the preceding vehicle icon 41a. More specifically, the first character string 41b is arranged at the uppermost position among positions of elements forming the first information image 41.

The mode display icon 41c is a figure indicating whether a mode is a hands-off mode or a hands-on mode. The hands-off mode is a mode (a first mode) in which the driver can release his or her hands from the steering 1 during automatic driving. On the other hand, the hands-on mode is a mode (a second mode) in which the driver needs to slightly touch the steering 1 with his or her hands during automatic driving. The mode display icon 41c has two kinds of figures that are a first steering figure and a second steering figure. The first steering figure shows only the steering, and the second steering figure shows the steering and the driver's hands slightly touching the steering. The first steering figure is used if the current mode is the hands-off mode. The second steering figure is used if the current mode is the hands-on mode. The first steering figure is displayed in blue, for example, and the second steering figure is displayed in green (only a steering portion), for example.

The first lane marker icon 41d is a figure showing left and right lane markers indicating boundaries of the host-vehicle lane. The left lane marker indicated in the first lane marker icon 41d indicates a boundary between the host-vehicle lane, and an adjacent lane or a road shoulder adjacent to the left side of the host-vehicle lane. Similarly, the right lane marker indicated in the first lane marker icon 41d indicates a boundary between the host-vehicle lane, and an adjacent lane or a road shoulder adjacent to the right side of the host-vehicle lane.

The arrow icon 41e is an arrow for guiding an automatic lane change. The arrow icon 41e has a shape that bends in the middle from a base end side of the arrow (a lower side of the figure) to a tip side of the arrow (an upper side of the figure). Further, the arrow icon 41e extends from the host-vehicle lane to the adjacent lane across the first lane marker icon 41d. That is, the arrow icon 41e schematically shows a state in which the host-vehicle makes a lane change by an automatic lane change, and guides an automatic lane change.

The first information image 41 shows a travelling state of a vehicle ahead of the host-vehicle with the preceding vehicle icon 41a and the first lane marker icon 41d. The first information image 41 is generated so as to represent the travelling state of the vehicle ahead of the host-vehicle, when the driver looks in a forward direction.

In the first information image 41, the travelling state of the vehicle ahead of the host-vehicle is shown two-dimensionally. This is because the first information image 41 is displayed on the head-up display 40. That is, by using a two-dimensional representation, the amount of information is limited, and the visibility of the first information image 41 is enhanced.

The first information image 41 is generated at a predetermined timing, and each time the new first information image 41 is generated, the first information image 41 displayed on the head-up display 40 is updated.

The first information image 41 does not need to always include all of the preceding vehicle icon 41a, the first character string 41b, the mode display icon 41c, the first lane marker icon 41d, and the arrow icon 41e. The first information image 41 may include some or all of the preceding vehicle icon 41a, the first character string 41b, the mode display icon 41c, the first lane marker icon 41d, and the arrow icon 41e.

A real travelling state of an actually traveling host-vehicle is reflected in the travelling state of the vehicle ahead of the host-vehicle shown in the first information image 41. Therefore, if the preceding vehicle is not present actually, the first information image 41 does not include the preceding vehicle icon 41a.

The control contents of the control system are reflected in the first character string 41b and the arrow icon 41e. That is, if there is no request from the control system, the first information image 41 does not include the first character string 41b and the arrow icon 41e.

The second information image 38 is mainly composed of a host-vehicle icon 38a, a second character string 38b, a second lane marker icon 38c, and a surrounding vehicle icon 38d.

The host-vehicle icon 38a is a figure indicating the host-vehicle.

The second character string 38b includes one or more characters such as Hiragana characters, Chinese characters, numbers and symbols, and is, for example, a sentence. Further, the second character string 38b may include emoji (a pictogram) that plays the same role as the character.

Similarly to the first character string 41b, the second character string 38b indicates the contents notified to the driver by the control system. Specifically, the second character string 38b includes the first character string 41b and another character string (a third character string). The contents of the third character string are the reason why the first character string 41b is notified. That is, the control system uses the second character string 38b to notify the driver of the request from the control system, or what the control system desires to perform, and the reason thereof. The second character string 38b has a larger amount of information than the first character string 41b in that the second character string 38b includes the third character string, in addition to the first character string 41b.

In this way, the second character string 38b includes the first character string 41b. The inclusion of the first character string 41b in the second character string 38b does not mean that the element (the first character string 41b) displayed on the first information image 41 is regarded as a part of the second character string 38b. Instead of the above, the above inclusion means that the second character string 38b includes a character string in which a string of characters is the same as the first character string 41b. However, the second character string 38b described above is merely an example, and may be composed of any characters without being restricted by such conditions.

The second character string 38b is positioned below the host-vehicle icon 38a. In other words, the second character string 38b is arranged at the lowermost position among positions of the elements forming the second information image 38.

The second lane marker icon 38c is a figure indicating lane markers showing boundaries of one or more lanes in the road on which the host-vehicle travels.

The surrounding vehicle icon 38d is a figure showing a surrounding vehicle traveling around the host-vehicle. The surrounding vehicle includes the preceding vehicle, and an adjacent vehicle traveling on the adjacent lane.

The second information image 38 shows travelling states of the host-vehicle, and a vehicle around the host-vehicle with the host-vehicle icon 38a, the second lane marker icon 38c, and a surrounding vehicle icon 38d. The surroundings of the host-vehicle include each of a space in a forward direction of the host-vehicle, spaces in left and right lateral directions of the host-vehicle, and a space in a backward direction of the host-vehicle. The second information image 38 is generated so as to represent the travelling state of the vehicle around the host-vehicle, when the host-vehicle is viewed from positions above and behind the host-vehicle. It is enough if the viewpoint showing the travelling state is at least above the host-vehicle, because the purpose is to perceive the travelling state of the vehicle around the host-vehicle In the second information image 38, the travelling state of the vehicle around the host-vehicle is shown three-dimensionally. The use of the three-dimensional representation further increases the amount of information than the two-dimensional representation. Accordingly, the second information image 38 can deliver more various pieces of information to the driver than the first information image 41.

The second information image 38 is generated at a predetermined timing, and each time the new second information image 38 is generated, the second information image 38 displayed on the meter display 35 is updated.

The second information image 38 does not need to always include all of the host-vehicle icon 38a, the second character string 38b, the second lane marker icon 38c, and the surrounding vehicle icon 38d. The second information image 38 may include a part or all of the host-vehicle icon 38a, the second character string 38b, the second lane marker icon 38c, and the surrounding vehicle icon 38d.

The real travelling state of the actually traveling host-vehicle is reflected in the travelling state of the vehicle around the host-vehicle shown by the second information image 38. Therefore, if the surrounding vehicle is not present actually, the second information image 38 does not include the surrounding vehicle icon 38d. Further, the second lane marker icon 38c corresponds to the number of lanes in the road on which the host-vehicle actually travels.

The control contents of the control system are reflected in the second character string 38b. That is, if there is no request from the control system, the second information image 38 does not include the second character string 38b.

Referring again to FIG. 1, the controller 10 will be described in detail. The controller 10 includes, as the plurality of information processing circuits, a route generation unit 11, an automatic traveling processing unit 12, a vehicle control unit 13, an image generation unit 14, a display control unit 15, a speaker control unit 16, and a winker control unit 17.

The route generation unit 11 generates a route to a destination preset by the driver. The route generation unit 11 outputs the generated route to the automatic traveling processing unit 12. The route generation unit 11 may acquire a route generated by an external device.

The automatic traveling processing unit 12 performs various processes necessary for performing an automatic lane change. An automatic lane change includes a state of a system proposal in which the automatic traveling processing unit 12 (the control system) makes the proposal to the driver to perform an automatic lane change, and a state of a driver proposal in which an automatic lane change is performed in response to the reception of the proposal made by the driver.

An automatic lane change proposed by the system occurs, if it is determined that a lane change is necessary to overtake the preceding vehicle. In addition to the above, an automatic lane change proposed by the system occurs, if it is determined that a lane change is necessary to maintain the route generated by the route generation unit 11. On the other hand, an automatic lane change proposed by the driver occurs, if the driver operates the winker switch 26 in a direction of a lane to which the driver desires to move.

The automatic traveling processing unit 12 calculates a position of the host-vehicle, a position of the surrounding vehicle, a relative speed between the host-vehicle and the preceding vehicle, and the like based on pieces of information output by the host-vehicle position estimating device 20, the map acquisition device 21, the surrounding information detection device 22, and the vehicle speed sensor 23. The automatic traveling processing unit 12 performs necessary calculations based on the position of the host-vehicle, the position of the surrounding vehicle, the relative speed between the host-vehicle and the preceding vehicle, the route generated by the route generation unit 11, and the like. The calculations made by the automatic traveling processing unit 12 also use pieces of information output by the steering switch 24, the touch sensor 25, and the winker switch 26. Further, the automatic traveling processing unit 12 outputs control commands necessary for an automatic lane change, and processes associated therewith to the vehicle control unit 13, the image generation unit 14, the display control unit 15, the speaker control unit 16, and the winker control unit 17.

The vehicle control unit 13 controls the steering actuator 30 and the like in response to the control command from the automatic traveling processing unit 12. The steering actuator 30 or the like operates in accordance with the control by the vehicle control unit 13. Accordingly, the behavior of the host-vehicle is controlled, and this enables an automatic lane change to be performed.

The image generation unit 14 generates the first information image 41 and the second information image 38. The first information image 41 is generated so as to represent the travelling state of the vehicle ahead of the host-vehicle based on pieces of information output by the host-vehicle position estimating device 20, the map acquisition device 21, the surrounding information detection device 22, and the vehicle speed sensor 23. Similarly, the second information image 38 is generated so as to represent the travelling state of the vehicle around the host-vehicle based on the pieces of information output by the host-vehicle position estimating device 20, the map acquisition device 21, the surrounding information detection device 22, and the vehicle speed sensor 23.

In addition, the image generation unit 14 generates the first information image 41 so as to include the first character string 41*b* based on the control command from the automatic traveling processing unit 12, that is, information to be notified to the driver. Similarly, the image generation unit 14 generates the second information image 38 so as to include the second character string 38*b* based on the control command from the automatic traveling processing unit 12, that is, the information to be notified to the driver.

The display control unit 15 displays the first information image 41 generated by the image generation unit 14 on the head-up display 40. Further, the display control unit 15 displays the second information image 38 generated by the image generation unit 14 on the meter display 35.

The speaker control unit 16 controls a speaker 33 in response to the control command from the automatic traveling processing unit 12. By being controlled by the speaker control unit 16, the speaker 33 outputs a notification sound to the driver.

The winker control unit 17 controls the winker 34 in response to the control command from the automatic traveling processing unit 12. The control of the winker 34 by the winker control unit 17 actuate either left or right winker 34.

A display control device according to the present embodiment includes the image generation unit 14 and the display control unit 15 among the plurality of information processing circuits constituting the controller 10. A display control method according to the present embodiment includes various processes performed by the image generation unit 14 and the display control unit 15.

Figure 4:
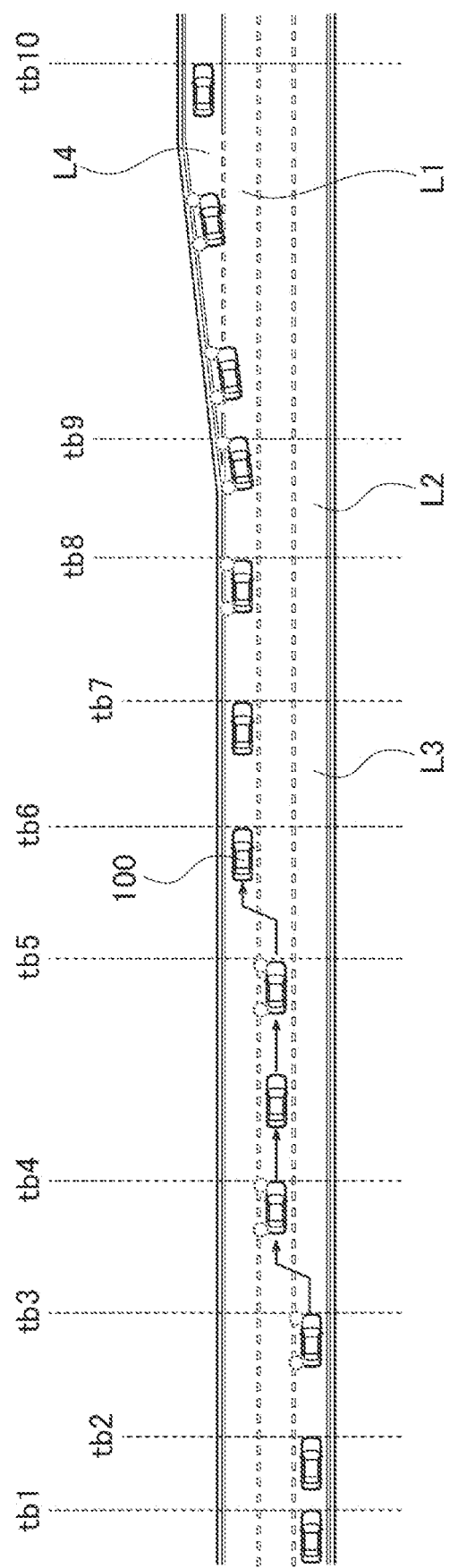
FIG. 4 is an explanatory diagram for showing a series of movements from a third lane to an exit path of a host-vehicle in a situation where an automatic lane change is performed along a route.

Hereinafter, with reference to FIG. 4, descriptions will be given for flows of an automatic lane change proposed by the system by taking an example of a situation in which the route generated by the route generation unit 11 is maintained. In order to travel toward an exit path L4 which branches from a main road, the host-vehicle 100 performs an automatic lane change from a third lane L3 to a second lane L2, then from the second lane L2 to a first lane L1, and then from the first lane L1 to the exit path L4.

In an automatic lane change, control flows of the automatic traveling processing unit 12 include the following.

(1) The unit proposes an automatic lane change to the driver (a timing tb1).
(2) The unit receives the driver's consent to perform an automatic lane change (a timing tb2)
(3) Prior to the start of an automatic lane change to the second lane L2, the winker 34 is actuated in a direction of a lane to which the host-vehicle is to be moved (a timing tb3).
(4) The unit completes an automatic lane change to the second lane L2 (first automatic lane change) (a timing tb4).
(5) Prior to the start of an automatic lane change to the first lane L1, the winker 34 is actuated in a direction of a lane to which the host-vehicle is to be moved (a timing tb5).
(6) The unit completes an automatic lane change to the first lane L1 (second automatic lane change) (a timing tb6).
(7) The unit determines that a distance between a branch point of the exit path L4 and the host-vehicle 100 becomes a predetermined first distance (a timing tb7).
(8) Prior to the start of an automatic lane change to the exit path L4, the winker 34 is actuated in a direction of the exit path L4 to which the host-vehicle is to be travelled (a timing tb8).
(9) The unit determines that the host-vehicle 100 has reached the branch point (a timing tb9).
(10) The unit completes an automatic lane change to the exit path L4 (third automatic lane change) (a timing tb10).

The control performed by the automatic traveling processing unit 12 in accordance with an automatic lane change, and the processes associated therewith includes a plurality of processes as described above. The first information image 41 displayed on the head-up display 40, and the second information image 38 displayed on the meter display 35 are changed depending on each process of the control.

In an automatic lane change from the third lane L3 to the exit path L4, the first information image 41 and the second information image 38 are changed depending on 10 processes.

Figure 5A:
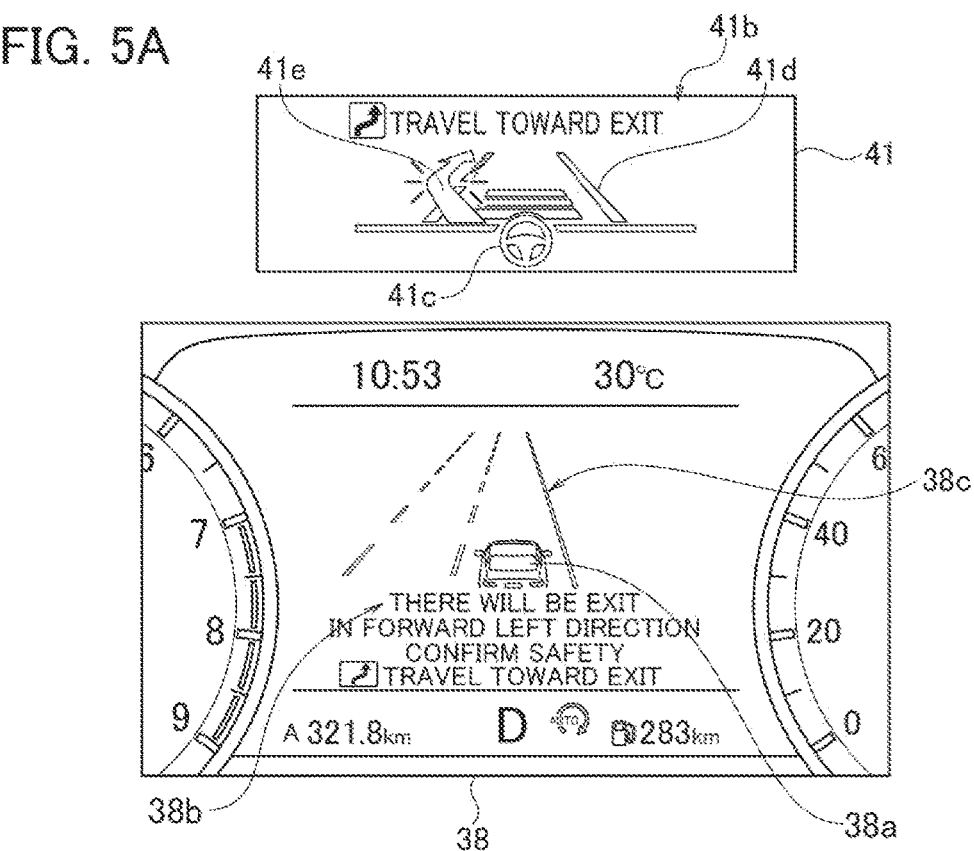
FIG. 5A is an explanatory diagram for showing an example of a first information image, and a second information image displayed, if an automatic lane change is performed along a route.
Figure 5B:
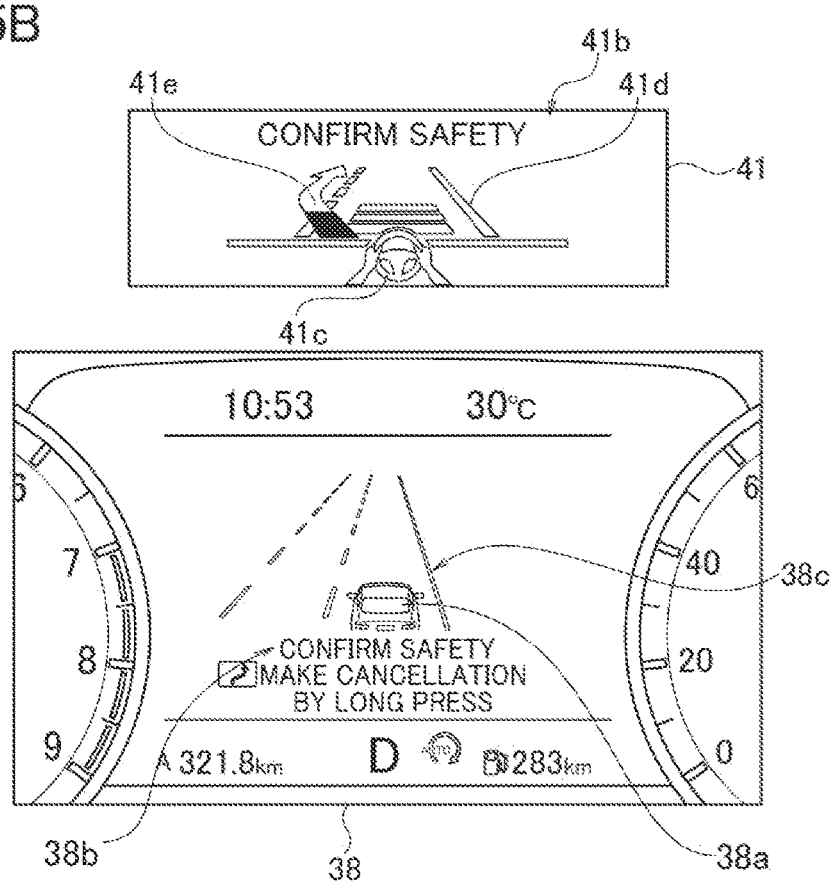
FIG. 5B is an explanatory diagram for showing an example of a first information image, and a second information image displayed, if an automatic lane change is performed along a route.
Figure 5C:
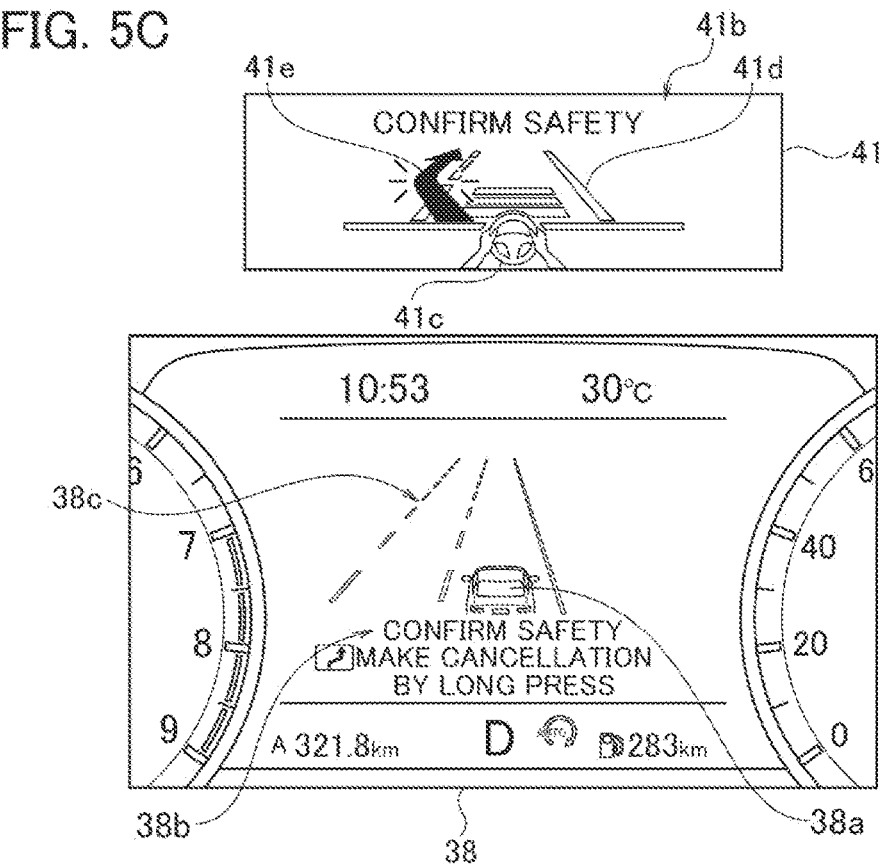
FIG. 5C is an explanatory diagram for showing an example of a first information image, and a second information image displayed, if an automatic lane change is performed along a route.

In a process up to the timing tb1, the first information image 41 and the second information image 38 are mainly composed of contents indicating the travelling state (not shown). In a process from the timing tb1 to before the timing tb2, the first information image 41 and the second information image 38 are mainly composed of the contents indicating the travelling state, and contents for proposing automatic lane change to the driver (FIG. 5A). In an process from the timing tb2 to before the timing tb3, the first information image 41 and the second information image 38 are mainly composed of the contents indicating the travelling state, and contents indicating that the driver's consent for performing an automatic lane change is received (FIG. 5B). In a process from the timing tb3 to before the timing tb4, the first information image 41 and the second information image 38 are mainly composed of the contents indicating the travelling state, and contents indicating that an automatic lane change is being performed (FIG. 5C).

Figure 5D:
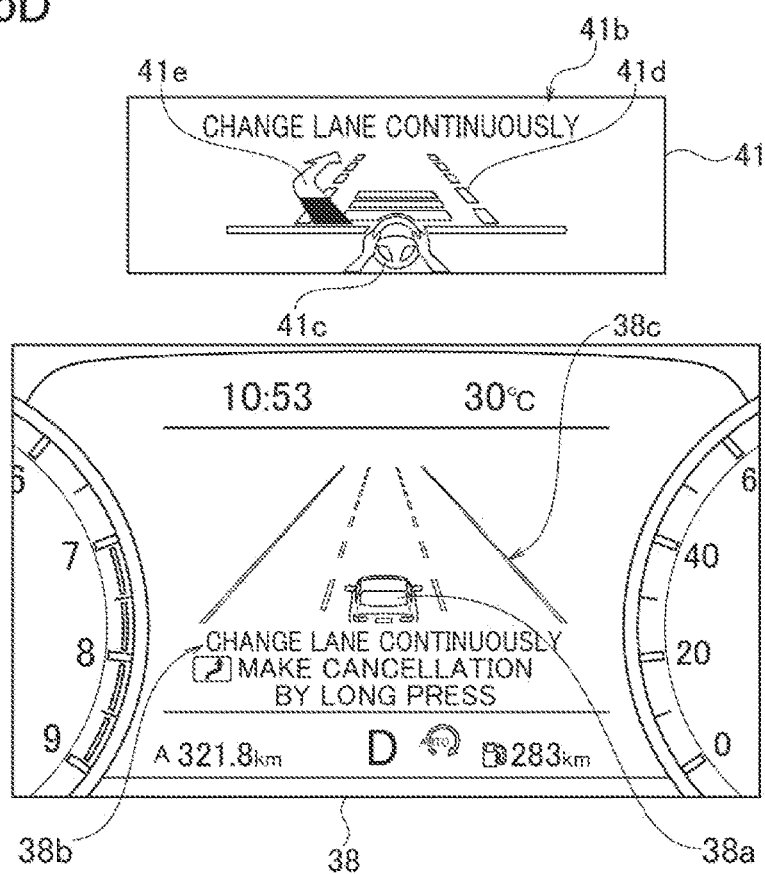
FIG. 5D is an explanatory diagram for showing an example of a first information image, and a second information image displayed, if an automatic lane change is performed along a route.
Figure 5E:
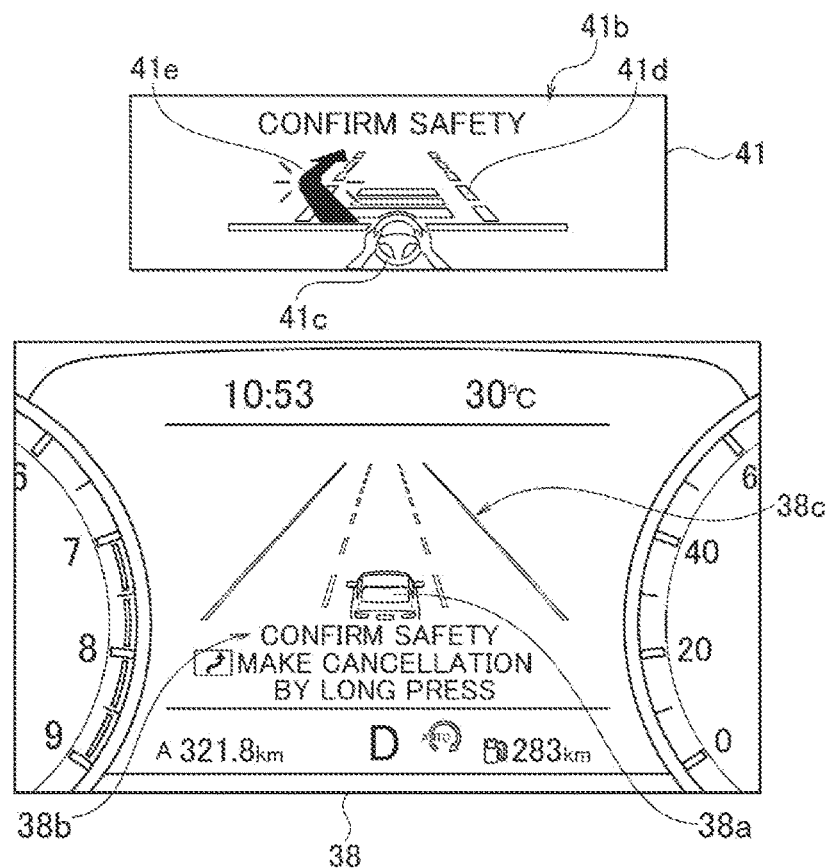
FIG. 5E is an explanatory diagram for showing an example of a first information image, and a second information image displayed, if an automatic lane change is performed along a route.
Figure 5F:
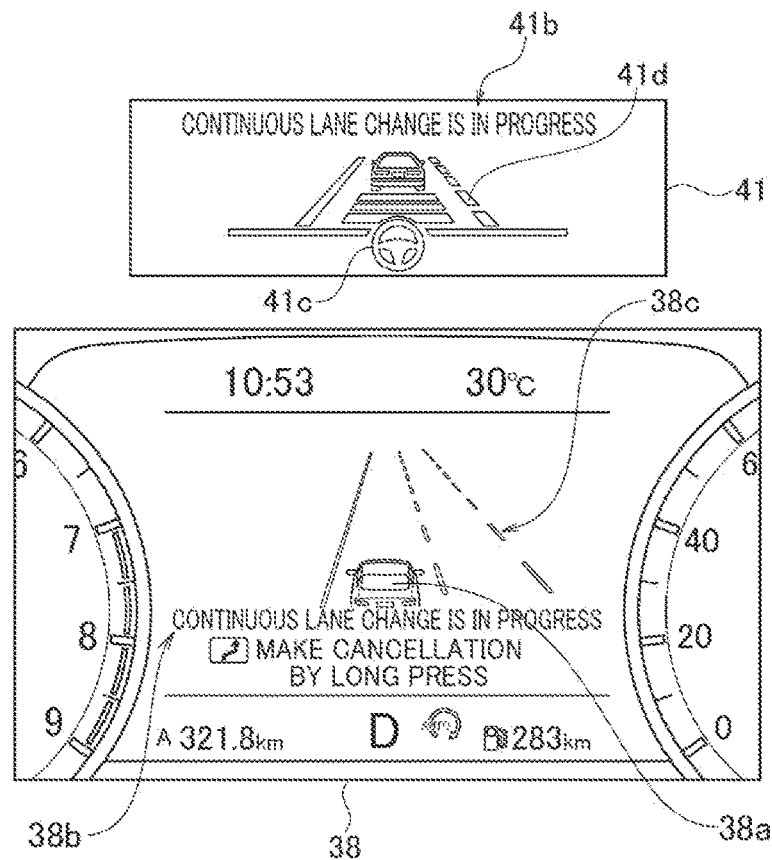
FIG. 5F is an explanatory diagram for showing an example of a first information image, and a second information image displayed, if an automatic lane change is performed along a route.

In a process from the timing tb4 to before the timing tb5, the first information image 41 and the second information image 38 are mainly composed of the contents indicating the travelling state, and contents for notifying a second automatic lane change (FIG. 5D). In a process from the timing tb5 to before the timing tb6, the first information image 41 and the second information image 38 are mainly composed of the contents indicating the travelling state, and contents indicating that an automatic lane change is being performed (FIG. 5E). In a process from the timing tb6 to before the timing tb7, the first information image 41 and the second information image 38 are mainly composed of the contents indicating the travelling state, and contents indicating that an automatic lane change is being continuously performed (FIG. 5F).

Figure 5G:
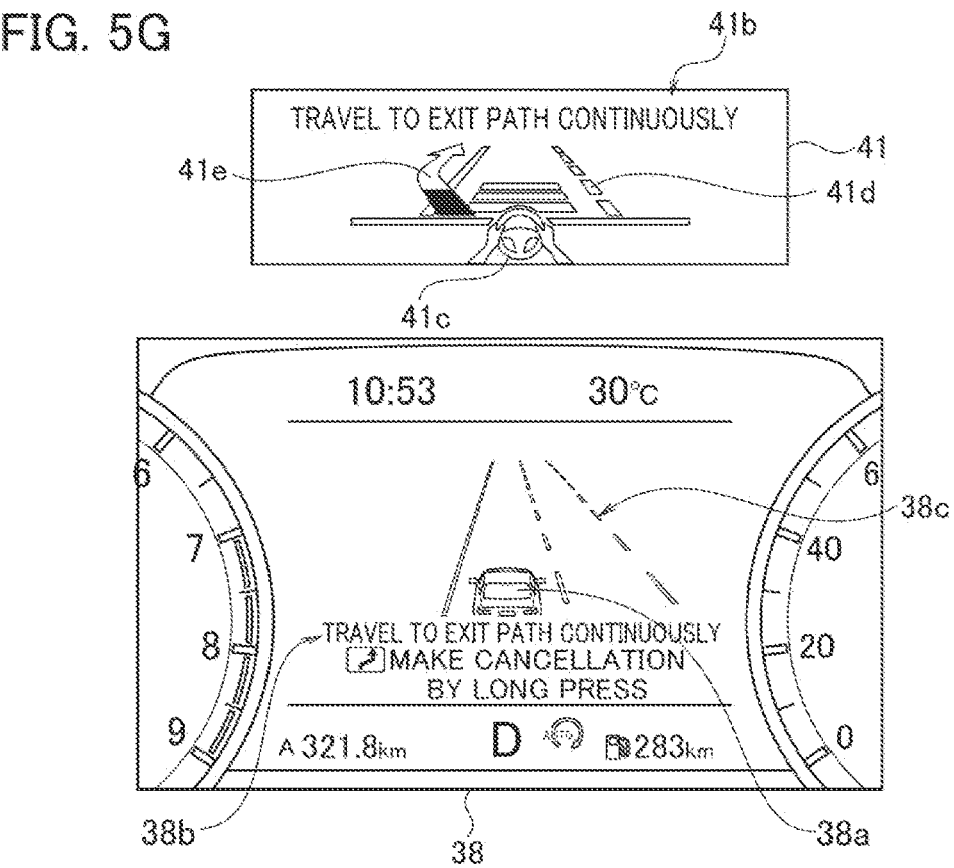
FIG. 5G is an explanatory diagram for showing an example of a first information image, and a second information image displayed, if an automatic lane change is performed along a route.
Figure 5H:
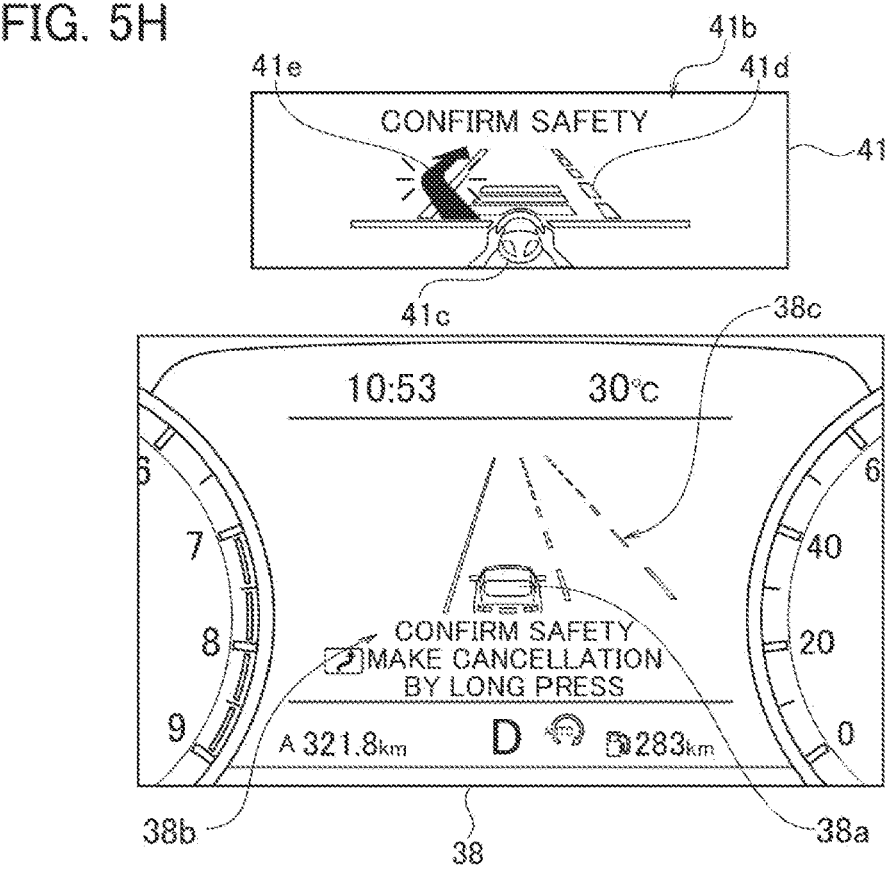
FIG. 5H is an explanatory diagram for showing an example of a first information image, and a second information image displayed, if an automatic lane change is performed along a route.
Figure 5I:
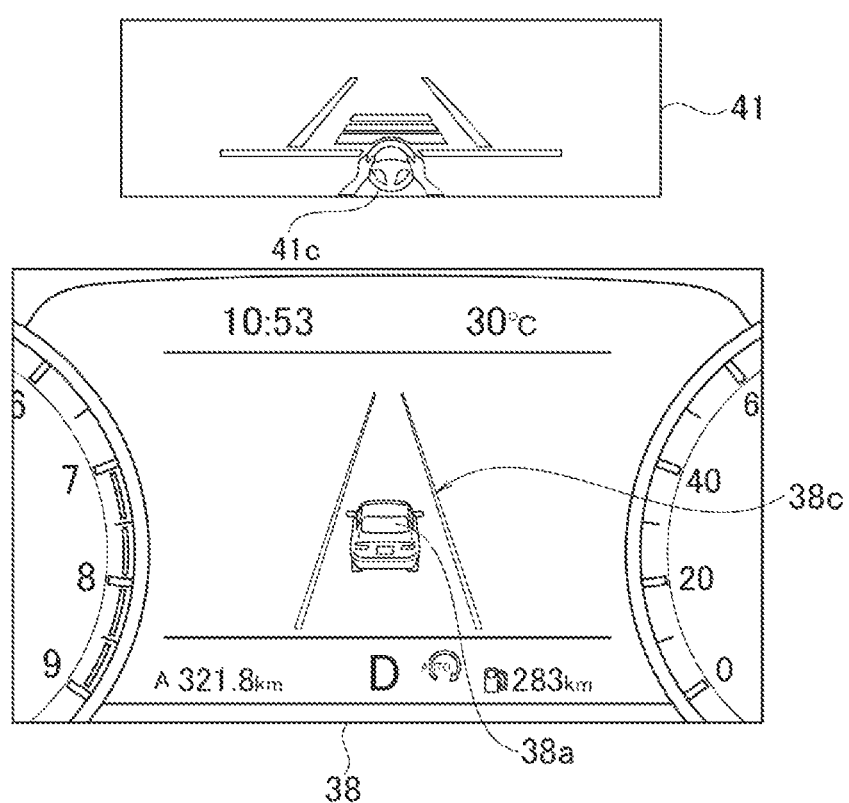
FIG. 5I is an explanatory diagram for showing an example of a first information image, and a second information image displayed, if an automatic lane change is performed along a route.

In a process from the timing tb7 to before the timing tb8, the first information image 41 and the second information image 38 are mainly composed of the contents indicating the travelling state, and contents for notifying that the host-vehicle will travel to the exit path L4 (FIG. 5G). In a process from the timing tb9 to before the timing tb10, the first information image 41 and the second information image 38 are mainly composed of the contents indicating the travelling state, and contents indicating that an automatic lane change is being performed (FIG. 5H). In a process at or after the timing tb10, the first information image 41 and the second information image 38 are mainly composed of the contents indicating the travelling state (FIG. 5I).

As shown in FIGS. 5A to 5I, the first information image 41 includes a preceding vehicle icon 41a and a first lane marker icon 41d, and shows a travelling state of a vehicle ahead of the host-vehicle. The second information image 38 includes a host-vehicle icon 38a, a second lane marker icon 38c, and a surrounding vehicle icon 38d, and shows a travelling state of a vehicle around the host-vehicle.

Further, the first information image 41 includes a first character string 41b, and the second information image 38 includes a second character string 38b. An example of the first character string 41b and the second character string 38b will be described below.

In FIG. 5B, the first character string 41b is a character string "(Pictogram) Travel toward an exit". The pictogram in the first character string 41b corresponds to a pictogram marked on the steering switch 24, and has the meaning to urge the operation of the steering switch 24 (the same applies hereinafter). The character string "(Pictogram) Travel toward an exit" indicate contents for proposing an automatic lane change to the driver.

In FIG. 5B, the second character string 38b includes character strings "There will be an exit in a forward left direction", "Confirm the safety", and "(Pictogram) Travel toward an exit". The character string "(Pictogram) Travel toward an exit" indicates contents for proposing an automatic lane change to the driver. The character string "There will be an exit in a forward left direction" indicates the reason why an automatic lane change is proposed. The character string "Confirm the safety" indicates the contents for proposing the safety confirmation to the driver. As described above, the second character string 38b includes the first character string 41b ("(Pictogram) Travel toward an exit"). In other words, the first character string 41b is the same as a part of the second character string 38b.

Further, the first information image 41 includes the arrow icon 41e. Flows of the change in the arrow icon 41e will be described below. The arrow icon 41e is displayed at a timing at which an automatic lane change is proposed to the driver.

A display scene in FIG. 5A corresponds to a process from a timing when the driver is proposed to perform an automatic lane change to before a timing when the driver's consent for performing an automatic lane change is received (the timing tb1 to the timing tb2). The arrow icon 41e blinks in white.

The display scene shown in FIG. 5B corresponds to a process from a timing when the driver's consent for performing an automatic lane change is received to before a timing when the winker 34 is actuated in a direction of a lane to which the host-vehicle is to be moved (the timings tb2 to the timing tb3). The arrow icon 41e is lit in white. A lit area that is lit in white is in the arrow icon 41e which is a figure representing an arrow, and is dynamically changed in the figure. Specifically, in the arrow icon 41e, the lit area that is lit in the arrow gradually increases from a base end side of the arrow (a lower side of the figure) to a tip side of the arrow (an upper side of the figure). When the lit area reaches the tip of the arrow (that is, when the entire arrow is lit), the light of the entire arrow is turned off once. Then, a series of flows from the increase in the lit area in the arrow, to the light-on of the entire arrow, and then to the light-off of the entire arrow is repeated. In FIG. 5B, a black-filled area indicated by the arrow icon 41e represents the lit area that is lit in white for convenience, and alternatively, a white-filled area represents a non-lit area for convenience (the same applies to FIGS. 5D and 5G described later).

The display scene in FIG. 5C corresponds to a process from the actuation of the winker 34 in a direction to which an automatic lane change is performed to before the completion of a first automatic lane change (the timing tb3 to the timing tb4). The arrow icon 41e is made to blink in green which is the same color as the display color of the mode display icon 41c. In FIG. 5C, the black-filled arrow icon 41e represents that the icon is made to blink in green for convenience (the same applies to FIGS. 5E, 5H, and 7B, which will be described later).

The display scene in FIG. 5D corresponds to a process from the completion of a first automatic lane change to before the actuation of the winker 34 to perform a second automatic lane change (the timing tb4 to the timing tb5). The arrow icon 41e is lit in white. A lit area that is lit in white is in the arrow icon 41e which is a figure representing an arrow, and is dynamically changed.

The display scene in FIG. 5E corresponds to a process from the actuation of the winker 34 in a direction to which a second automatic lane change is performed to before the completion of a second automatic lane change (the timing tb5 to the timing tb6). In this case, the arrow icon 41e is made to blink in green.

The individual display scenes in FIGS. 5G and 5H relate to the third automatic lane change, and the details thereof are the same as those of the individual display scenes in FIGS. 5D and 5E. A display scene shown in FIG. 5F indicates that an automatic lane change is being continuously performed during a time from the completion of a second automatic lane change to before the start of the third automatic lane change.

Further, the display scene in FIG. 5I corresponds to the completion of the third automatic lane change, that is, the completion of all automatic lane changes. The display of the arrow icon 41e is ended.

The image generation unit 14 and the display control unit 15 generate and display the first information image 41 and the second information image 38 as described above in response to the control command from the automatic traveling processing unit 12. At this time, the display control unit 15 displays the first information image 41 and the second information image 38 such that the first character string 41b and the second character string 38b are displayed at the same time.

With reference to FIG. 6, flows of automatic lane change proposed by the driver will be described below. After the driver operates the winker switch 26, the host-vehicle 100 performs an automatic lane change from the first lane L1 to the second lane L2.

In an automatic lane change, control flows of the automatic traveling processing unit 12 include the following. (1) The driver operates the winker switch 26 (a timing ta1). (2) An automatic lane change to the second lane L2 is completed (a timing ta2).

The control performed by the automatic traveling processing unit 12 in accordance with an automatic lane change and the processes associated therewith includes a plurality of processes as described above. The first information image 41 displayed on the head-up display 40, and the second information image 38 displayed on the meter display 35 are changed depending on each process of the control.

In an automatic lane change from the first lane L1 to the second lane L2, the first information image 41 and the second information image 38 are changed depending on three processes.

Figure 7A:
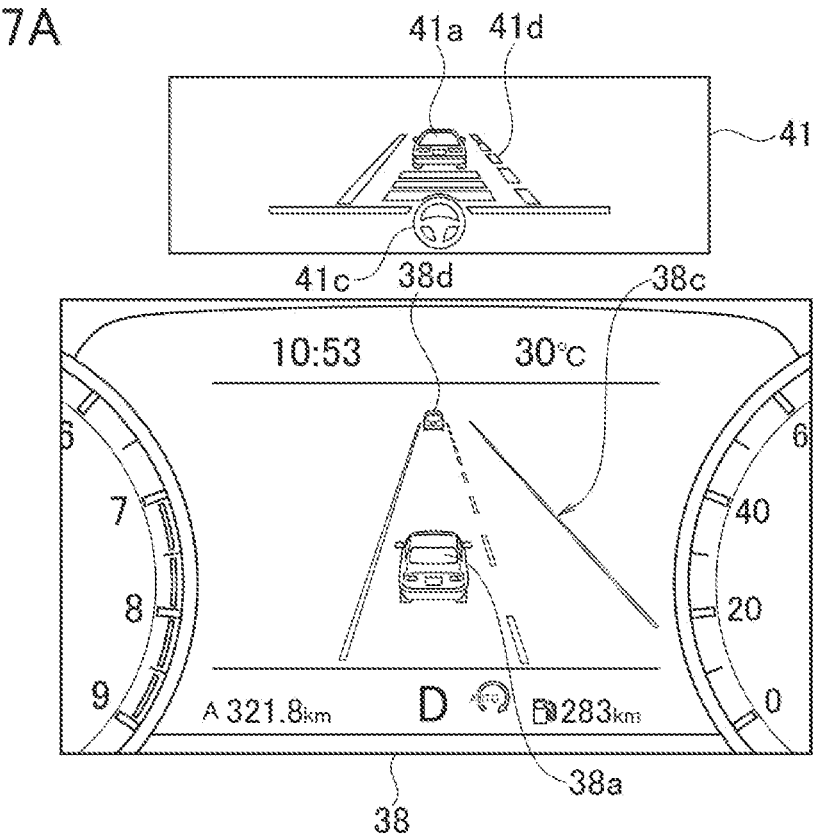
FIG. 7A is an explanatory diagram for showing an example of a first information image, and a second information image displayed, if an automatic lane change proposed by a driver is performed.
Figure 7B:
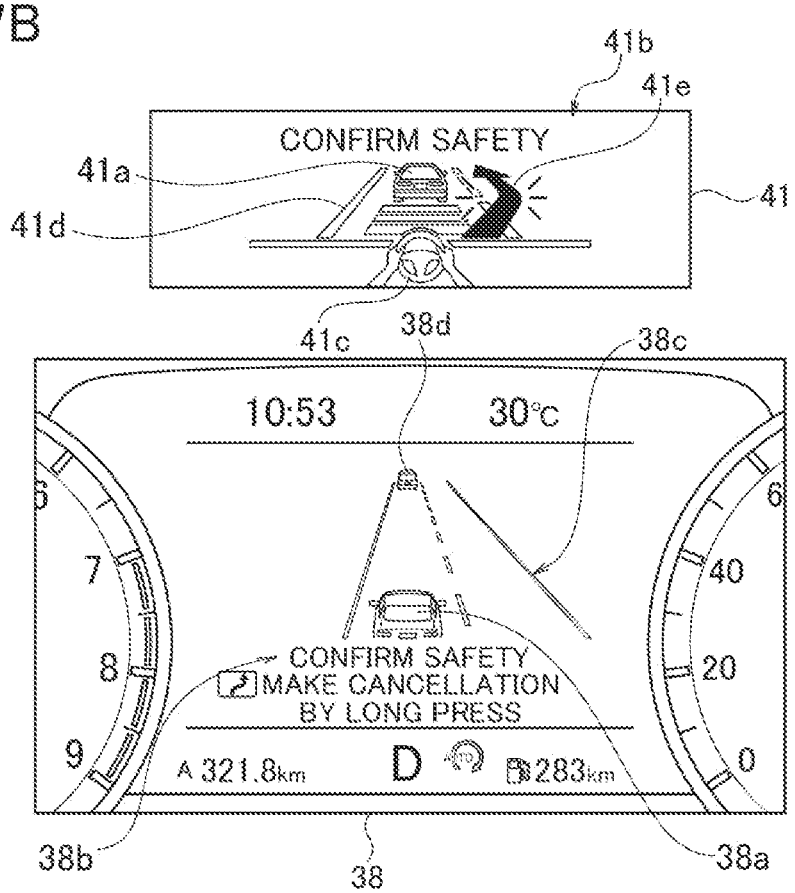
FIG. 7B is an explanatory diagram for showing an example of a first information image, and a second information image displayed, if an automatic lane change proposed by a driver is performed.

In a process up to the timing ta1, the first information image 41 and the second information image 38 are mainly composed of contents indicating the travelling state (FIG. 7A). In a process from the timing ta1 to before the timing ta2, the first information image 41 and the second information image 38 are mainly composed of the contents indicating the travelling state, and contents indicating that an automatic lane change is being performed (FIG. 7B). In a process at or after the timing ta2, the first information image 41 and the second information image 38 are mainly composed of the contents indicating the travelling state (FIG. 7C).

Figure 7C:
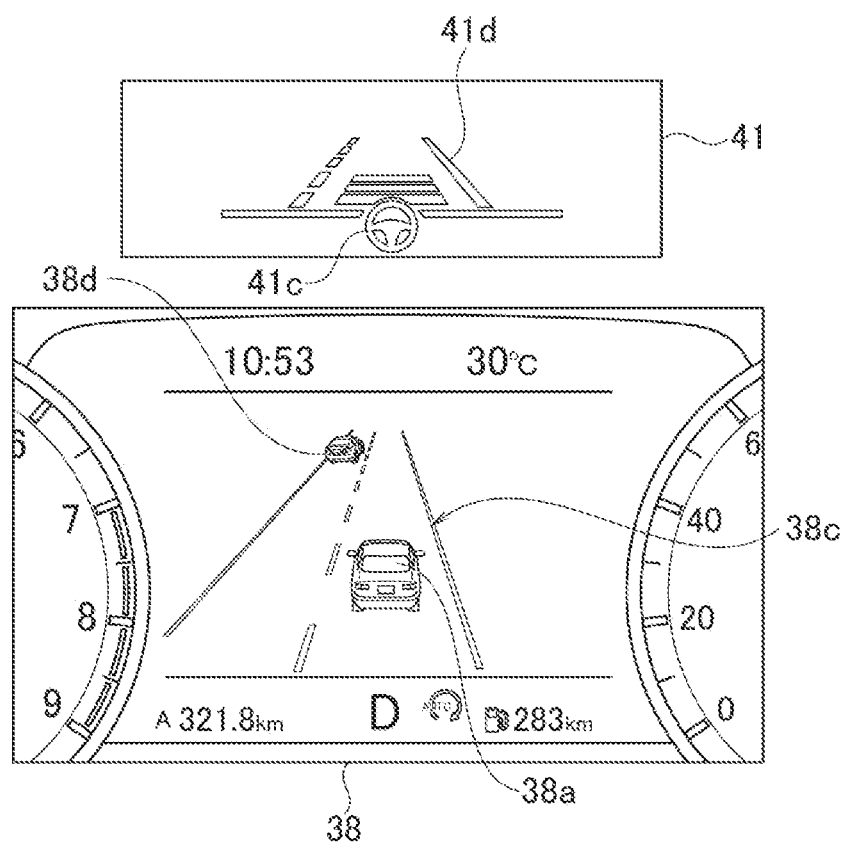
FIG. 7C is an explanatory diagram for showing an example of a first information image, and a second information image displayed, if an automatic lane change proposed by a driver is performed.

As shown in FIGS. 7A to 7C, the first information image 41 includes the preceding vehicle icon 41a, and the first lane marker icon 41d, and shows the travelling state of the vehicle ahead of the host-vehicle. Further, the second information image 38 includes the host-vehicle icon 38a, the second lane marker icon 38c, and the surrounding vehicle icon 38d, and shows the travelling state of the vehicle around the host-vehicle.

Further, the first information image 41 includes the first character string 41b, and the second information image 38 includes the second character string 38b. An example of the first character string 41b and the second character string 38b will be described below.

In FIG. 7B, the first character string 41b is a character string "Confirm the safety". The character string "Confirm the safety" indicates contents for urging the driver to confirm the safety.

In FIG. 7B, the second character string 38b includes character strings "Confirm the safety" and "(Pictogram) Make cancellation by long press". The character string "Confirm the safety" indicates the contents for urging the driver to confirm the safety. The character string "(Pictogram) Make cancellation by long press" indicates contents for notifying the driver of how to stop an automatic lane change. In this way, the second character string 38b includes the first character string 41b ("Confirm the safety"). In other words, the first character string 41b is the same as a part of the second character string 38b.

Further, the first information image 41 includes the arrow icon 41e. The arrow icon 41e will be described below. The arrow icon 41e is displayed when the driver operates the winker switch 26.

The display scene in FIG. 7B corresponds to a process from the operation of the winker switch 26 by the driver to before the completion of an automatic lane change (the timings ta1 to the timing ta2). The arrow icon 41e is made to blink in green.

The display scene shown in FIG. 7C corresponds to a case where an automatic lane change is completed. The display of the arrow icon 41e is ended.

Different forms of the second information image 38 will be described below.

The automatic traveling processing unit 12 performs the linkage control (navigation linkage control) for causing the host-vehicle to travel by linking with a route generated by the route generation unit 11. The automatic traveling processing unit 12 performs the above described automatic lane change in the linkage control. However, when determining a predetermined condition, for example, a traffic congestion, the automatic traveling processing unit 12 prohibits the function of an automatic lane change.

Figure 8A:
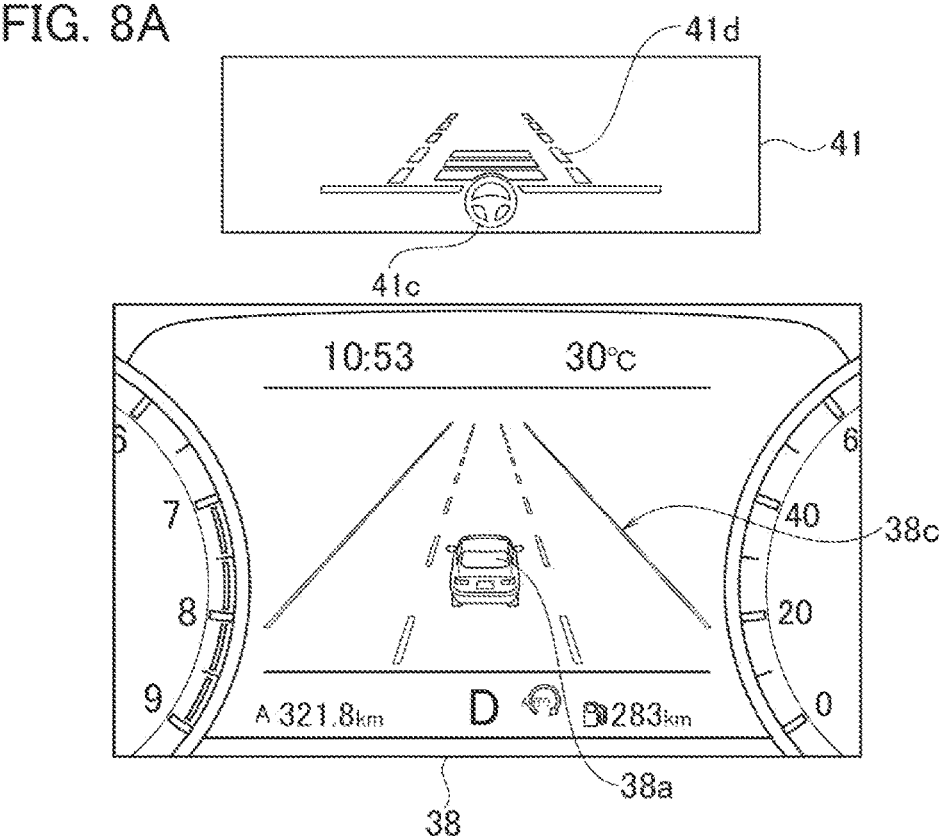
FIG. 8A is an explanatory diagram for showing an example of a first information image, and a second information image.
Figure 8B:
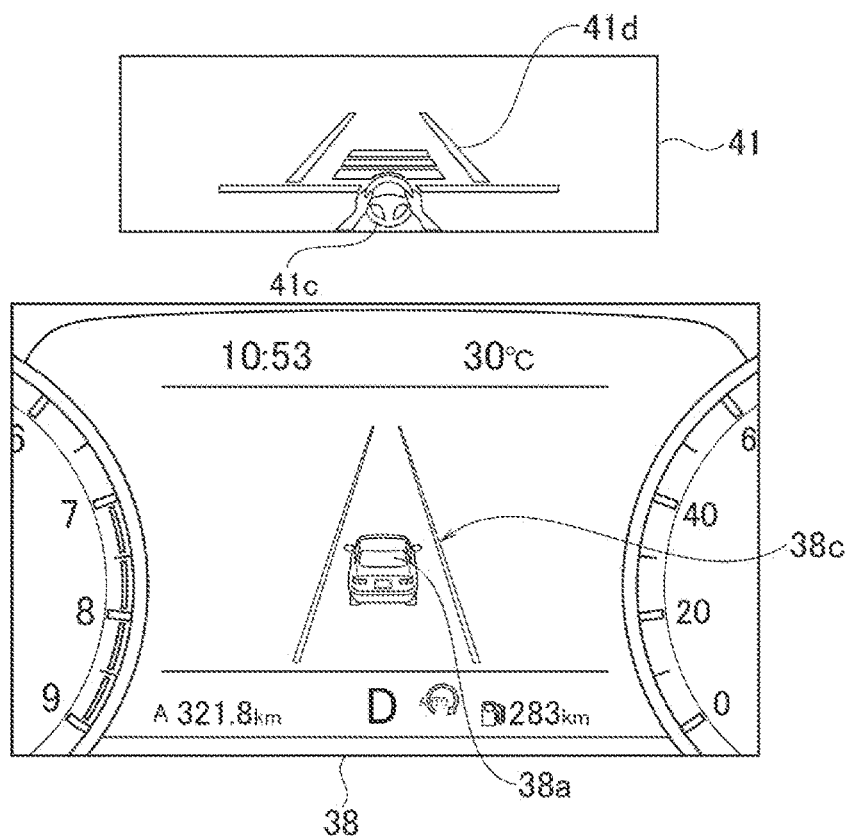
FIG. 8B is an explanatory diagram for showing an example of a first information image, and a second information image.

In a case of a time period during which an automatic lane change can be performed, the second information image 38 has a form shown in FIG. 8A. That is, the second information image 38 includes the second lane marker icon 38c (a first lane image) that has the host-vehicle lane on which the host-vehicle travels, and an adjacent lane that is adjacent to the host-vehicle lane. On the other hand, in a case of a time period during which an automatic lane change may not be performed, the second information image 38 has a form shown in FIG. 8B. That is, the second information image 38 includes the second lane marker icon 38c (a second lane image) that only has the host-vehicle lane on which the host-vehicle travels.

As described above, in the display control method according to the present embodiment, when the control system proposes an automatic lane change to the driver of the host-vehicle, an image showing an arrow for guiding an automatic lane change (the arrow icon 41e) is displayed on the head-up display 40, and a display method for the arrow icon 41e is switched in response to the plurality of processes in the control performed by the control system.

The driver can perceive the state of the control performed by the control system from the change in the display method for the arrow icon 41e. As a result, it is possible to provide a display that is easy for the driver to understand, and a display that provides a sense of security to the driver.

A first process of the plurality of processes in the display control method according to the present embodiment is from a time when the control system proposes an automatic lane change to the driver, to before a time when the control system receives the driver's consent for performing an automatic lane change. In the first process, the arrow icon 41e is made to blink. A second process of the plurality of processes in the display control method is from the time when the control system receives the driver's consent for performing an automatic lane change to before a time when the control system actuates the winker 34 in a direction to which an automatic lane change is performed. In the second process, the arrow icon 41e is changed such that a lit area increases from a base end side of the arrow to a tip side of the arrow. A third process of the plurality of processes in the display control method is from the time when the control system actuates the winker 34 in the direction to which an automatic lane change is performed, to before a time when an automatic lane change by the control system is completed. In the third process, the arrow icon 41e is made to blink. In the display control method, the display of the arrow icon 41e is ended, if an automatic lane change by the control system is completed.

A display mode of the arrow icon 41e is switched at a timing of the change from the first process to the second process. This enables the driver to understand that the control system has received the driver's consent. Further, the display mode of the arrow icon 41e is switched at a timing of the change from the second process to the third process. This enables the driver to perceive that an automatic lane change is started, that is, the control of the behavior of the host-vehicle is started. Further, the end of the display of the arrow icon 41e enables the driver to perceive that an automatic lane change by the control system is completed.

In the first and second processes in the display control method according to the present embodiment, the arrow icon 41e is displayed in a first display color. In the third process, the arrow icon 41e is displayed in a second display color different from the first display color.

At a timing when the behavior control of the host-vehicle is started, the display color of the arrow icon 41e is switched. Accordingly, the driver can perceive in advance that the behavior control of the host-vehicle is started from the display color of the arrow icon 41e.

In the present embodiment, the first display color is a white color, and the second display color is a green color. The color is set to be the same as the color of the mode display icon 41c in the hands-on mode. This makes it possible to notify the driver of the fact that the driver needs to slightly touch the steering 1 with his or her hands in an easy to understand way when the behavior control of the host-vehicle is started.

Further, in the display control method according to the present embodiment, the proposal of an automatic lane change by the control system may include the first automatic lane change, and the second automatic lane change following the first automatic lane change. In this case, a fourth process in the display control method is from a time when the first automatic lane change by the control system is completed to before a time when the control system actuates the winker 34 for a second automatic lane change. In the fourth process, the arrow icon 41e is changed such that the lit area increases from the base end side of the arrow to the tip side of the arrow. A fifth process in the display control method is from the time when the control system actuates the winker 34 for a second automatic lane change to before a time when a second automatic lane change by the control system is completed. In the fifth process, the arrow icon 41e is made to blink.

The driver's consent is already received prior to the first automatic lane change, and therefore, the driver's consent is not required in a second automatic lane change. This enables control specifications with less loads on the driver. By omitting a state in which the arrow icon 41e is made to blink in white, the driver can understand, from the display, the process of the control in which the driver's consent to perform a second automatic lane change is omitted.

Further, in the display control method according to the present embodiment, the arrow icon 41e is displayed, if the control system determines that the driver has actuated the winker 34 in order to cause the control system to start an automatic lane change. In the display control method, the arrow icon 41e is displayed in a blinking state during a time period from a time when the driver actuates the winker 34 to before a time when an automatic lane change by the control system is completed.

If an automatic lane change is performed based on the driver's intension, it is clear that the driver intends to perform an automatic lane change, and therefore, the control process is also simplified. This makes it possible to guide an automatic lane change with a simple display method.

Further, in the display control method according to the present embodiment, if a condition is satisfied in which an automatic lane change can be performed, the first lane image (the second lane marker icon 38c) is further displayed. The first lane image indicates the host-vehicle lane on which the host-vehicle travels, and the adjacent lane that is adjacent to the host-vehicle lane. Alternatively, in the display control method, if the condition is not satisfied in which an automatic lane change can be performed, the second lane image (the second lane marker icon 38c) indicating only the host-vehicle lane is further displayed.

The driver can determine whether the driver is in a situation to perform an automatic lane change from the displayed lane state.

The display control device according to the present embodiment includes the controller 10 that controls the head-up display 40 which can be visually recognized by the driver of the host-vehicle. If the control system proposes an automatic lane change to the driver of the host-vehicle, the controller 10 displays the arrow icon 41e representing the arrow for guiding an automatic lane change on the head-up display 40, and switches the display method for the arrow icon 41e depending on the plurality of processes in the control performed by the control system.

The display control device according to the present embodiment has a technical feature corresponding to the display control method described above, and achieves the same effect as the display control method.

The present invention is not limited to the embodiment described above, and various modifications are possible without departing from the scope of the present invention.

For example, in the first image displayed on the head-up display, the vehicle icon may be a figure representing a vehicle, and is not limited to the figure representing the preceding vehicle. Further, in the second image displayed on the meter display, the vehicle icon may be a figure representing a vehicle, and is not limited to the figure representing the host-vehicle.

The arrow icon is displayed on the head-up display, and the control according to the present embodiment is applied to the arrow icon. However, the similar control may be performed with the meter display. Switching between the first lane image and the second lane image may be applied to the display of the head-up display.

REFERENCE SIGNS LIST

10. Controller
11. Route generation unit
12. Automatic traveling processing unit
13. Vehicle control unit
14. Image generation unit
15. Display control unit
16. Speaker control unit
17. Winker control unit
20. Host-vehicle position estimating device
21. Map acquisition device
22. Surrounding information detection device
23. Vehicle speed sensor
24. Steering switch
25. Touch sensor
26. Winker switch
30. Steering actuator
31. Accelerator pedal actuator
32. Brake actuator
33. Speaker
34. Winker
35. Meter display
40. Head-up display

The invention claimed is:

1. A display control method used for a control system that controls a behavior of a host-vehicle to perform a lane change, the display control method comprising:
displaying an image showing an arrow for guiding the lane change on a display that can be visually recognized by a driver, in a situation where the control system makes a proposal to perform the lane change to the driver of the host-vehicle, wherein
the image is displayed on the display in a first display mode in response to the proposal made by the control system to the driver to perform the lane change;
the image is displayed on the display in a second display mode switched from the first display mode in response to a consent of the driver for the proposal; and
the image is displayed on the display in a third display mode switched from the second display mode in accordance with an actuation of a winker in a direction in which the lane change by the control system is performed.

2. The display control method according to claim 1, further comprising a plurality of processes, wherein
in a first process of the plurality of processes, the image is made to blink, the first process being from when the control system makes the proposal to perform the lane change to the driver to before the control system receives the consent of the driver to perform the lane change;
in a second process of the plurality of processes, the image is changed such that a lit area increases from a base end side of the arrow to a tip side of the arrow, the second process being from when the control system receives the consent of the driver to perform the lane change to before the control system actuates the winker in the direction in which the lane change is performed;
in a third process of the plurality of processes, the image is made to blink, the third process being from when the control system actuates the winker in the direction in which the lane change is performed to before the lane change by the control system is completed; and
when the lane change by the control system is completed, the display of the image is ended.

3. The display control method according to claim 2, wherein
in the first process and the second process, the image is displayed in a first display color; and
in the third process, the image is displayed in a second display color different from the first display color.

4. The display control method according to claim 2, wherein
if the proposal made by the control system to perform the lane change includes a first lane change, and a second lane change following the first lane change, in a fourth process, the image is changed such that the lit area increases from the base end side of the arrow to the tip side of the arrow, the fourth process being from when the first lane change by the control system is completed to before the control system actuates the winker for the second lane change; and
in a fifth process, the image is made to blink, the fifth process being from when the control system actuates the winker for the second lane change to before the second lane change by the control system is completed.

5. The display control method according to claim 1, wherein
the image is displayed, if the control system determines that the driver actuates the winker to cause the lane change by the control system to be started; and
the image is displayed in a blinking state during a time from when the driver actuates the winker to before the lane change by the control system is completed.

6. The display control method according to claim 1, wherein
a first lane image is further displayed, if a condition in which the lane change can be performed is satisfied, the first lane image showing a host-vehicle lane on which the host-vehicle travels, and an adjacent lane that is adjacent to the host-vehicle lane; and
a second lane image showing only the host-vehicle lane is further displayed, if the condition in which the lane change can be performed is not satisfied.

7. A display control device used for a control system that controls a behavior of a host-vehicle to perform a lane change, the display control device comprising:
a controller that controls a display that can be visually recognized by a driver of the host-vehicle, wherein
in a situation where the control system makes a proposal to perform the lane change to the driver of the host-vehicle, the controller displays an image showing an arrow for guiding the lane change on the display;
the image is displayed on the display in a first display mode in response to the proposal made by the control system to the driver to perform the lane change;
the image is displayed on the display in a second display mode switched from the first display mode in response to a consent of the driver for the proposal; and
the image is displayed on the display in a third display mode switched from the second display mode in accordance with an actuation of a winker in a direction in which the lane change by the control system is performed.

* * * * *